United States Patent
Engstrom et al.

(10) Patent No.: US 8,713,702 B2
(45) Date of Patent: Apr. 29, 2014

(54) DIGITAL MEDIA CONTENT DISTRIBUTION

(75) Inventors: G. Eric Engstrom, Kirkland, WA (US); Peter Zatloukal, Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 1478 days.

(21) Appl. No.: 11/157,481

(22) Filed: Jun. 21, 2005

(65) Prior Publication Data

US 2007/0005503 A1 Jan. 4, 2007

Related U.S. Application Data

(60) Provisional application No. 60/581,737, filed on Jun. 21, 2004.

(51) Int. Cl.
*H04L 29/06* (2006.01)
*G06F 21/10* (2013.01)

(52) U.S. Cl.
CPC .................................. *G06F 21/10* (2013.01)
USPC .......................................................... 726/28

(58) Field of Classification Search
CPC ... H04L 9/0866; H04L 9/0819; H04L 9/0847; G06F 21/10; G06F 21/105
USPC .................................. 380/44–47; 726/26–29
See application file for complete search history.

(56) References Cited

U.S. PATENT DOCUMENTS

| 5,414,455 | A | * | 5/1995 | Hooper et al. | 725/88 |
|---|---|---|---|---|---|
| 6,587,837 | B1 | * | 7/2003 | Spagna et al. | 705/26 |
| 6,829,593 | B1 | * | 12/2004 | Ritter et al. | 705/51 |
| 7,302,591 | B2 | * | 11/2007 | Oliver et al. | 713/193 |
| 8,270,609 | B2 | * | 9/2012 | Ma | 380/270 |
| 2002/0037738 | A1 | * | 3/2002 | Wycherley et al. | 455/550 |
| 2002/0085711 | A1 | * | 7/2002 | Scheidt et al. | 380/44 |
| 2003/0028490 | A1 | * | 2/2003 | Miura et al. | 705/59 |
| 2003/0120505 | A1 | * | 6/2003 | Spiegel | 705/1 |
| 2003/0200177 | A1 | * | 10/2003 | Kugai | 705/51 |
| 2004/0117619 | A1 | * | 6/2004 | Singer et al. | 713/156 |
| 2005/0251576 | A1 | * | 11/2005 | Weel | 709/227 |

* cited by examiner

*Primary Examiner* — Jeffrey D Popham
(74) *Attorney, Agent, or Firm* — Stoel Rives LLP

(57) ABSTRACT

A method for distributing digital media content, including the use of a digital performance right key that is unique for a media content and a subscriber of the digital media content distribution service, and apparatuses configured to practice the method or portions thereof, are described herein.

36 Claims, 10 Drawing Sheets

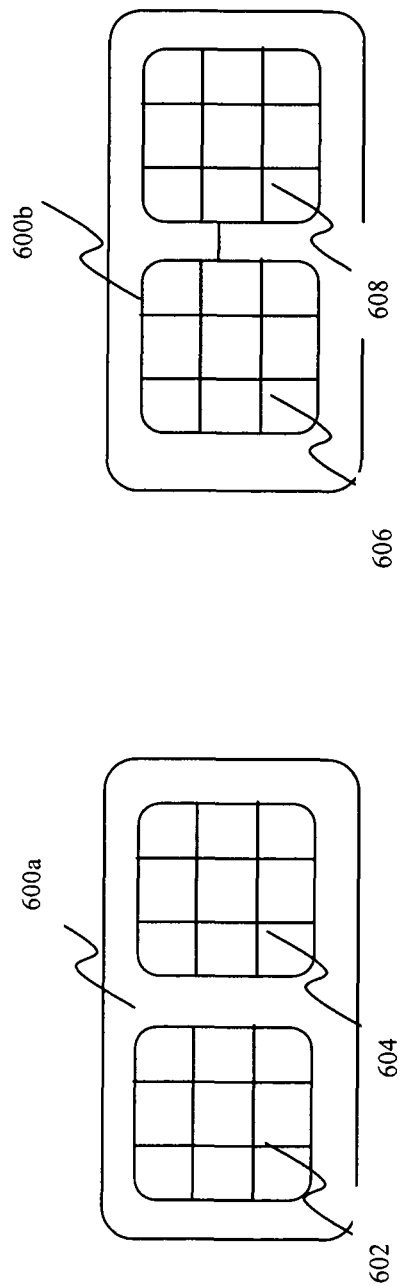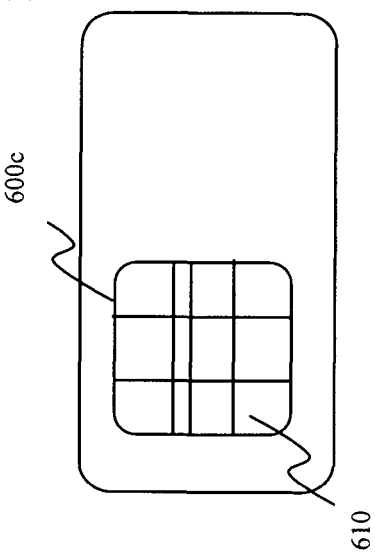
Figure 5a
Figure 5b
Figure 5c

DIGITAL MEDIA CONTENT DISTRIBUTION

RELATED APPLICATION

This application claims the benefit of priority from Provisional Application Ser. No. 60/581,737, filed Jun. 21, 2004, which specification is fully incorporated herein by reference

TECHNICAL FIELD

Embodiments of the present invention relate to the fields of digital media content distribution and consumption. More specifically, embodiments of the present invention are related to distribution and consumption methods and apparatuses that employ digital performance right keys that are unique for each combination of a media content and a subscriber.

BACKGROUND OF THE INVENTION

Advances in semiconductor, processor and related technologies have made possible the availability of computing power to the average users that was once deliverable only by the large main frames. At the same time, advances in telecommunication, networking and related technologies have increased connectivity of computing devices. Further, with the advance of the Internet and the World Wide Web, abundant media contents, including video and songs, are now available to the average users.

Today, users may readily download a variety of media contents from the "Internet", some illegally, creating a severe financial drain on the media content industries, in particular, the music industry. In response, a number of media content distribution services, such as iTunes and Netflix, and a number of portable music players, such as iPod, have emerged. These services and players provide users with relatively low cost, and somewhat efficient options to purchase and consume media contents legitimately, while providing the media content owners with reasonable protection for their property rights, i.e. against misappropriation.

However, these options still suffer from a number of disadvantages. For example, a song purchased and downloaded onto a portable music player, such as iPod, may only be consumed in the relative low fidelity digital encoding format (MP3) used by the portable music players. Further, when compared to the amount of songs that can be downloaded and stored on a typical laptop or desktop computer, the number of songs that can be downloaded and stored on a portable music player are relatively small. The relative few songs that are downloaded and stored on a portable music player are not readily shareable with others.

Still further, when a song is purchased through an iTunes like service, the purchase comes with only a limited number of copies. Over time, device failures or other reasons may cause the end-user to have to re-download, and eventually lose their legal purchase of the song. In other words, these services do not provide persistence of the purchases.

BRIEF DESCRIPTION OF THE DRAWINGS

The present invention will be described by way of exemplary embodiments, but not limitations, illustrated in the accompanying drawings in which like references denote similar elements, and in which:

FIGS. 5a-5c illustrate the subscriber identifier module of FIG. 3b, in accordance with various alternate embodiments; and;

DETAILED DESCRIPTION OF ILLUSTRATIVE EMBODIMENTS

Illustrative embodiments of the present invention include but are not limited to, digital media content distribution methods, portable and set-top media devices, and media content servers equipped to practice various aspects of the digital media content distribution methods.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Parts of the description will be presented in terms, such as data, media content, keys, generation, download, streaming, and so forth, consistent with the manner commonly employed by those skilled in the art to convey the substance of their work to others skilled in the art. As well understood by those skilled in the art, these quantities take the form of electrical, magnetic, RF, or optical signals capable of being stored, transferred, combined, and otherwise manipulated through electrical and/or optical components of a processor and its subsystems.

Part of the descriptions will employ various abbreviations, including but are not limited to:

| | |
|---|---|
| CDROM | Compact Disc Read Only Memory |
| DVD | Digital Versatile Disc |
| GPRS | Global Packet Radio Service |
| GSM | Global System for Mobile Communication |
| HTTP | HyperText Transfer Protocol |
| IEEE | Institute of Electrical and Electronic Engineers |
| RF | Radio Frequency |
| SMS | Short Messaging Service |
| Wi-Fi | Wireless Fidelity (IEEE 802.11a, b, g currently) |
| USB | Universal Serial Bus |

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising", "having", and "including" are synonymous, unless the context dictates otherwise.

Figure 1:
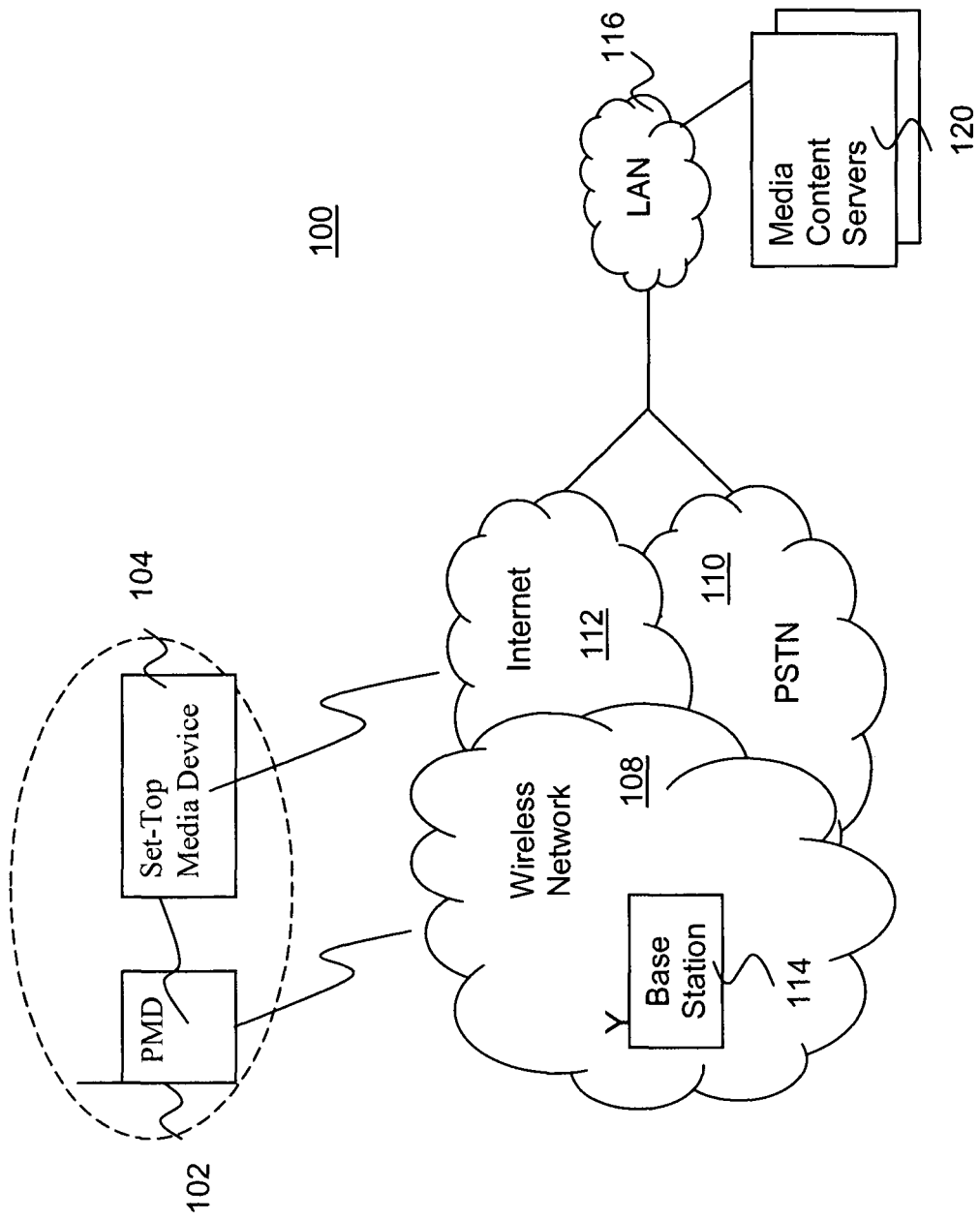
FIG. 1 illustrates an overview of the invention, in accordance with various embodiments.

Referring now to FIG. 1, wherein a block diagram illustrating an overview of the present invention 100, in accordance with various embodiments, is shown. As illustrated and to be described more fully below, portable media device 102 is equipped with hardware and/or software elements to facilitate a user in purchasing/licensing, consuming and sharing digital media content in a novel manner. More specifically, for these embodiments, the user is a subscriber of a novel digital media content distribution service offered/implemented by media content servers 120. Accordingly, portable media device 102 may also be referred to as a subscriber device. As will be described more fully below, the digital media content distribution service employs digital performance keys (DPKs) to license performance rights of its media content assets. The user/subscriber may use portable media device 102 as a repository of the digital performance keys of the media contents, which performance rights the user/subscriber have licensed. In various embodiments, the user/subscriber may also use portable media device 102 to store and/or render (thus consume) the media contents which performance rights the user/subscriber have licensed. Further, the user/subscriber may also use portable media device 102 to enable (sharing and) consumption of the media contents which performance rights the user/subscriber have licensed, using a proximally located set-top media device 104. Typically, the media content may be consumed in higher fidelity over the consumption provided by using the portable media device 102 alone. Higher fidelity is not a requirement however, it could be only a different encoding format for convenience or a streaming versus locally stored differentiation.

In various embodiments, the purchase of the performance rights may be persistent. That is, in the event of damage or loss of portable media device 102, the digital media content distribution service may re-provide the digital performance keys of the previously purchased/licensed media content to a replacement portable media device 102 of the service subscriber.

Resultantly, a user/subscriber of the digital media content distribution may carry a substantial portion or the entire portfolio of a user/subscriber's purchased/licensed media contents with the user/subscriber at all time. Further, the user/subscriber may enjoy purchased/licensed media content in more than one fidelity, using portable media device 102 or a proximally disposed set-top media device 104. The flexible manner of consumption also enables the user/subscriber to share consumption of the purchased/licensed media content with others, while still according reasonable protection to the property rights of the media content owners. Moreover, the subscriber's investments are protected. These are just a few exemplary possible benefits of the various embodiments of the present invention.

Continuing to refer to FIG. 1, as alluded to earlier, in various embodiments, portable media device 102, by virtue of its portability characteristic, may be adapted to work with and render media content provided in a digital encoding format of relatively lower fidelity. Whereas, set-top media device 104, by virtue of its set-top characteristic, may be adapted to work with and render media content provided in a different digital encoding format, in particular, a digital encoding format of higher fidelity, relatively speaking. In other words, the novel digital media content distribution service offers media contents in multiple digital encoding formats, including providing multiple levels of fidelity. On licensing of the performance rights of a media content, the user/subscriber may selectively consume the licensed media content on different media devices, adapted to work with different encoding formats, at varying fidelity levels, depending on the capability of the rendering media devices.

For the embodiments, to support the earlier described (sharing and) consumption of a licensed media content via set-top media device 104, both portable media device 102 and set-top media device 104 are equipped with hardware and/or software components to support data communication with another similarly equipped device within the supported communication range. Typically, the communication range is a relatively "short" range. In various embodiments, both portable media device 102 and set-top media device 104 are equipped to support wireless communication in accordance with wireless communication protocol specified by the IEEE 802.11g standard (Wi-Fi). In other embodiments, other wireless communication protocols such as Bluetooth may be supported instead or in addition. In yet other embodiments, portable media device 102 and set-top media device 104 may be equipped to communicate with each other over a wired connection, e.g. a serial (USB or IEEE 1394) connection.

In various embodiments, portable media device 102 may be a portable music player, or a portable video player. For the embodiments, portable media device 102 is also equipped with hardware and/or software components to provide wireless telephony and data communication, in particular, in accordance with the GSM and GPRS standards. In other words, for the embodiments, portable media device 102 may double as a wireless mobile phone. Stated in another manner, portable media device 102 is a wireless mobile phone enhanced to support the purchasing/licensing, consumption and sharing of digital media content offered/distributed by digital media content distribution service implemented by media content servers 120.

The term "wireless mobile phone" as used herein refers to the class of telephony devices equipped to make and receive calls wirelessly, notwithstanding movement, as long as the device is within the communication reach of a service or base station of a wireless network service provider. Unless specifically excluded, these terms are to include the analog subclass as well as the digital subclass (of all signaling protocols).

Similarly, in various embodiments, set-top media device 104 may be a set-top audio player, a set-top video player, or a computer of any one of a number of form factors, e.g. laptop, desktop, and so forth.

Still referring to FIG. 1, as illustrated, portable media device or wireless mobile phone 102, set-top media device 104 and media content servers 120 are communicatively coupled to each other vie wireless network 108 (including base stations 114), Internet 112, Public Switching Telephone Network (PSTN) 110, and Local Area Network (LAN) 116. In other words, in addition to the communication capabilities earlier described for portable media device 102 and set-top media device 104, set-top media device 104 and media content servers 120 are further equipped with the appropriate hardware and/or software components to enable these devices to communicate with one another over one or more of the above enumerated networks 108-112.

Figure 2A:
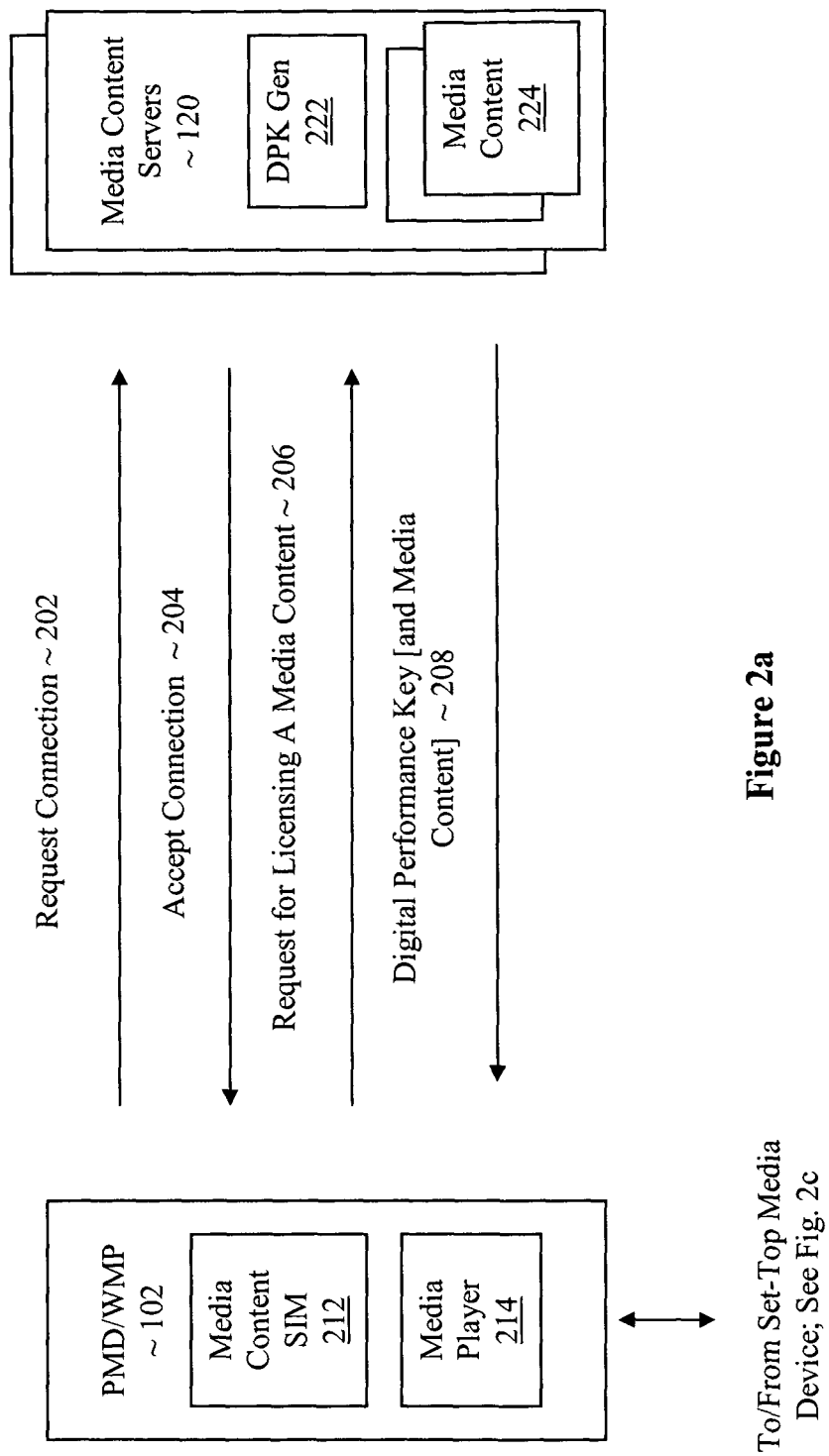
FIGS. 2a-2c illustrate three protocol views of the interactions between the media devices and the media content server of FIG. 1, in accordance with various embodiments.
Figure 2B:
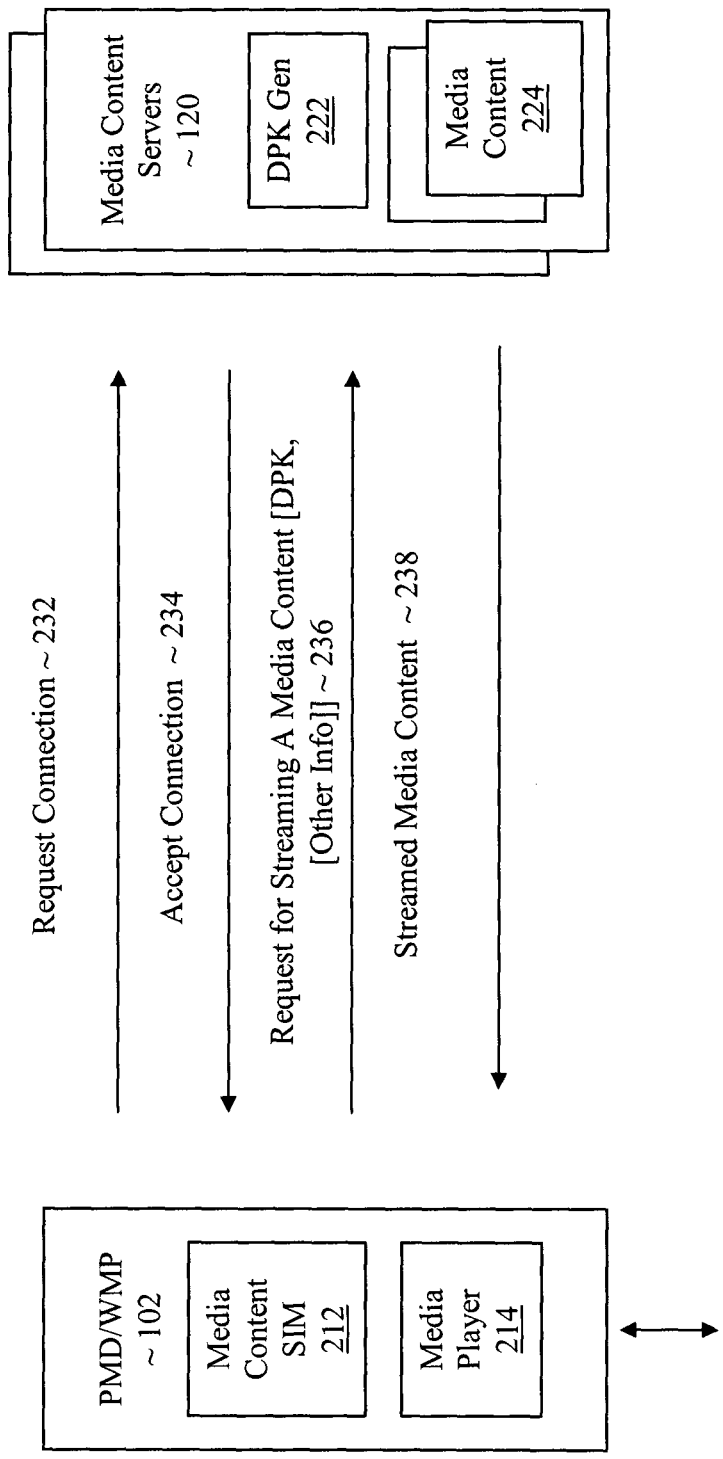
Figure 2C:
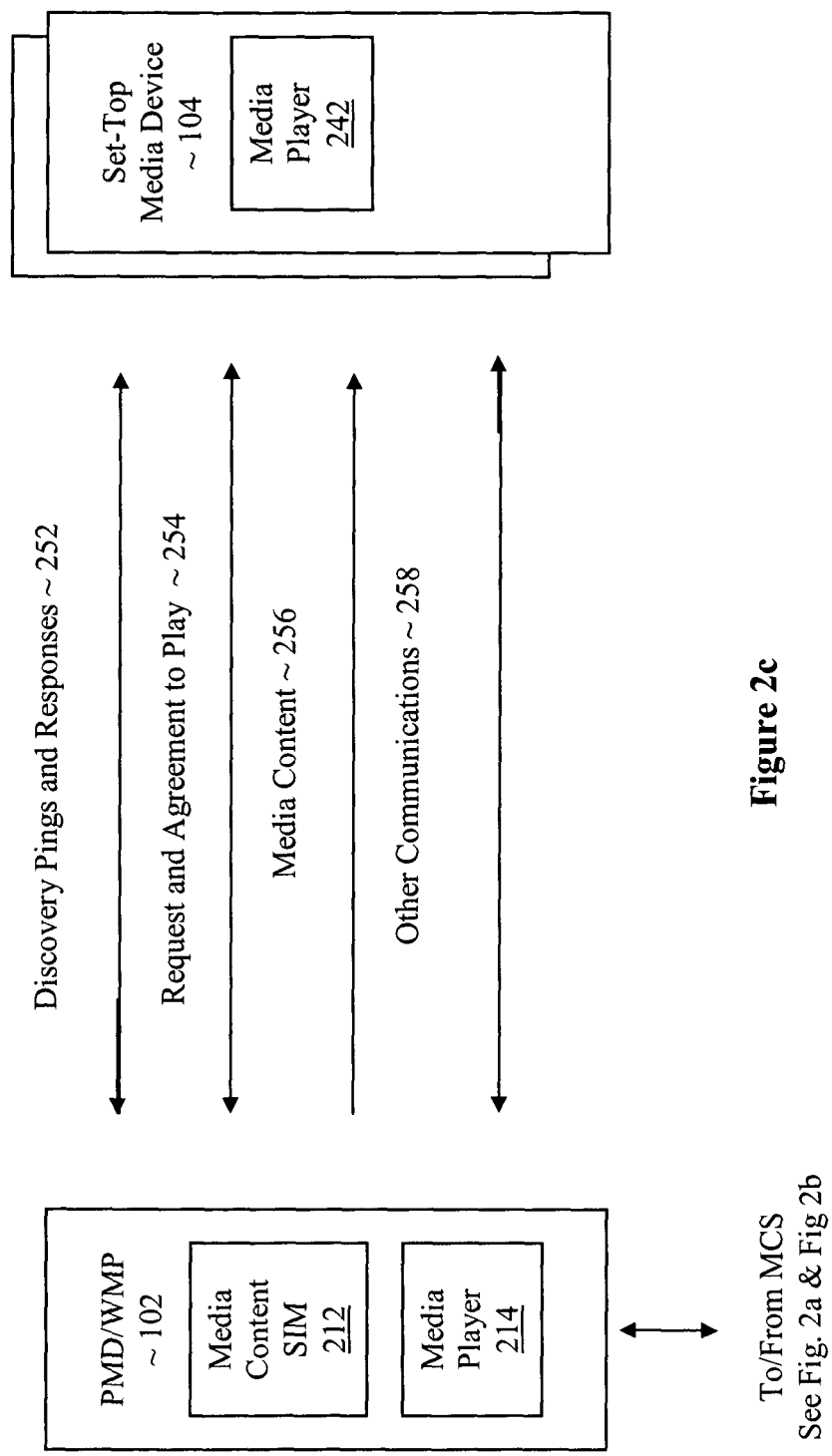

Referring now to FIGS. 2a-2c, wherein three protocol views of the interaction between media devices 102-104 and media content servers 120, in accordance with various embodiments, are shown. As illustrated in FIG. 2a-2b, in addition to the various hardware and/or software components to provide the various communication capabilities, for the embodiments, portable media device 102 further includes in particular media content subscriber identification module (SIM) 212 and media player 214. SIM 212 is employed to store in particular a subscriber identifier, identifying the user as a subscriber of the digital media content distribution service. Further, SIM 212 is employed to store the digital performance keys of the media contents the subscriber owns, and use the digital performance keys to decrypt portions or all of the purchased/licensed media contents. In various embodiments, SIM 212 is also employed to maintain required periodic communication with the digital media content distribution service, as a part of fraud prevention. In particular, in various embodiments, SIM 212 is adapted to track the amount of elapsed time, since it was able to last check in with the digital media content distribution service, and if the amount of elapsed time exceeds a pre-determined threshold, SIM 212 would automatically render itself disabled from rendering purchased media contents and/or making further purchases.

Figure 3A:
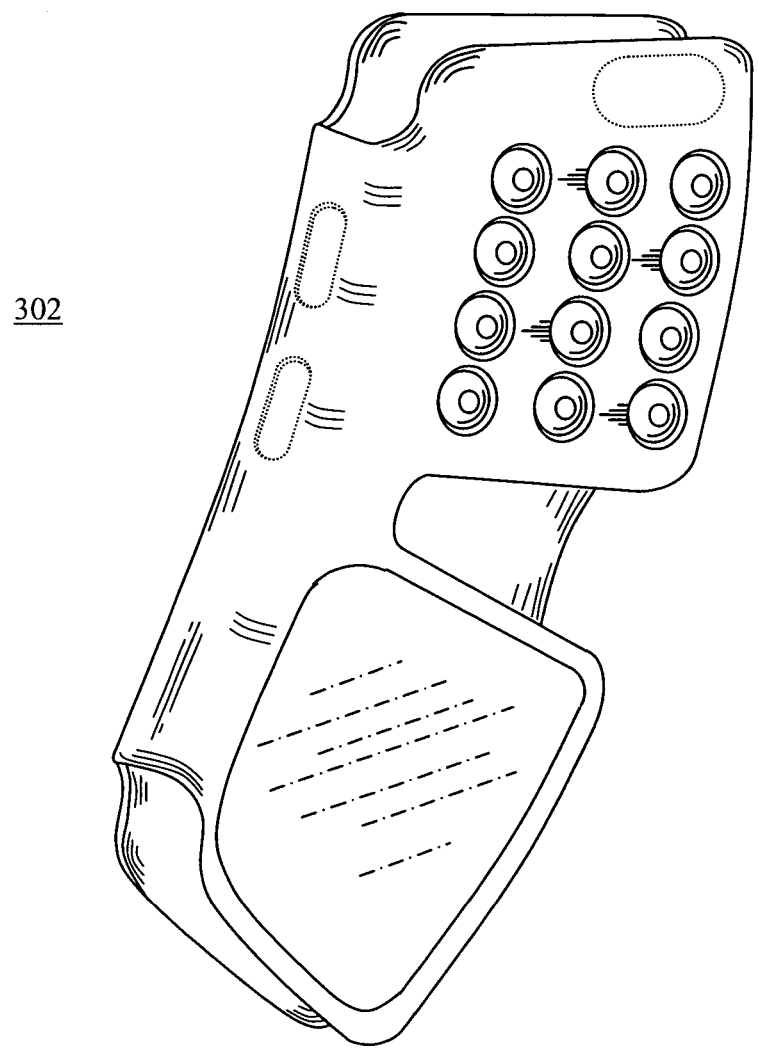
FIGS. 3a-3c illustrate a wireless mobile phone embodiment of the portable media device of FIG. 1, in accordance with various embodiments.
Figure 3B:
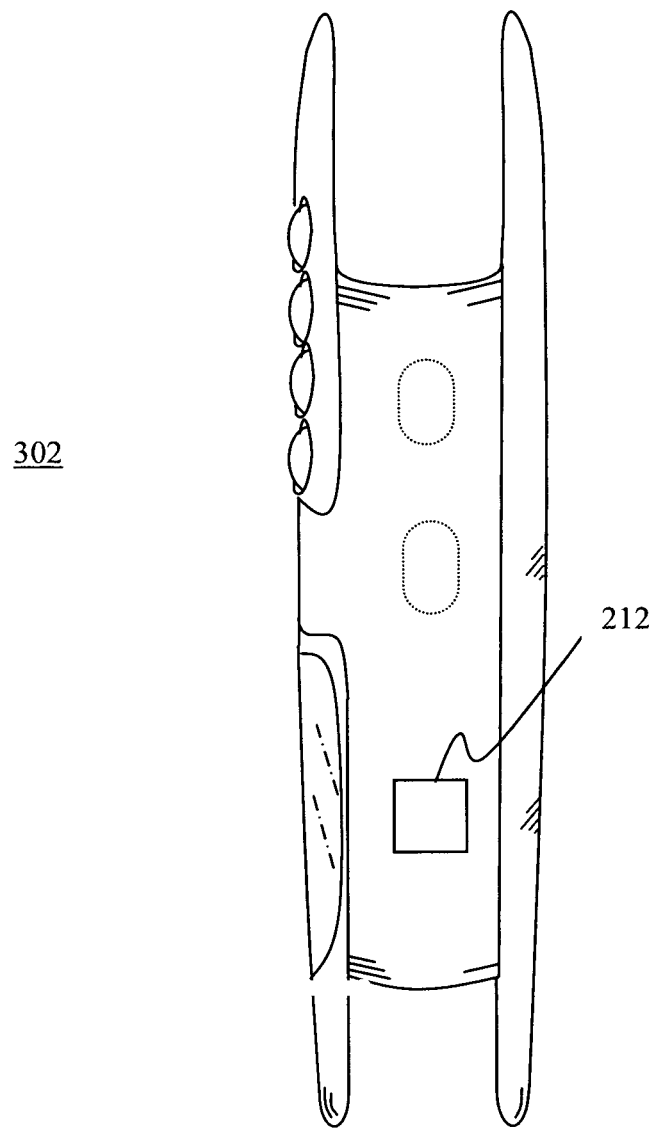

In various embodiments, SIM 212 is similarly packaged like a GSM SIM (see e.g. FIG. 3*b*). In other words, for these embodiments, SIM 212 conforms to the electrical and mechanical specifications of the GSM standard, however, it is adapted to facilitate digital media content distribution, instead of wireless telephony. However, in alternate embodiments, SIM 212 does not have to conform to the GSM SIM standard.

In yet other embodiments, media content distribution SIM 212 may be integrated with the GSM SIM, as illustrated in FIGS. 5*a*-5*c*. More specifically, FIG. 5*a*-5*b* illustrates two embodiments 600*a* and 600*b* where in each case, two smart cards 602 and 604 (606 and 608) are employed, one for wireless mobile phone service, 602/606, and the other for digital media content distribution service 604/608, but the two smart cards 602 and 604 (606 and 608) are integrated into a single unified SIM 600*a*/600*b*. In the case of FIG. 5*a*, each smart card 602/604 is provided with its own processor to independently perform the respective functions. In the case of digital media content distribution service, these functions include the functions of decryption, using DPK, as described earlier. However, in the case of FIG. 5*b*, the two smart cards 606 and 608 are coupled together, and only one smart card 606 is provided with a processor, while the other 608 is substantially a storage type smart card. FIG. 5*c* illustrates yet another embodiment 600*c* where the smart cards for digital media content distribution and GSM functions are integrated into a single unified smart card 608, providing access to the wireless mobile phone service, and the digital media content distribution service. In still other embodiments, the present invention anticipates the wireless mobile phone service may be of other protocols, including but are not limited to CDMA, as their SIM standards are defined.

In various embodiments, each smart card, e.g. 604, 608, adapted to provide the digital media content distribution service may be further equipped with a clock (not shown) to track the amount of elapsed time, since the SIM was last able to check in with MCS 120. In still other embodiments, each of such smart cards may be adapted with a circuit element that effectively disables the smart card on loss of power, to prevent theft of the SIM 600*a*/600*b*. An example of such circuit element may include but are not limited to a properly placed capacitor that discharges over time, on loss of power, and when fully discharged, effectively disables the smart card 604/608

Referring now to FIG. 2*a*-2*c* again, media player 214 is equipped to render one or more media types. In various embodiments, media player 214 is equipped to render music/songs provided in the digital encoding format MP3. In other embodiments, media player 214 is equipped to render video provided in the digital encoding format CVD. In still other embodiments, media player 214 is equipped to render one or more media encoded in one or more relatively lower fidelity format.

As illustrated in FIG. 2*c*, in addition to the various hardware and/or software components to provide the various communication capabilities, for the embodiments, set-top media device 104 further includes in particular media player 242. Media player 242 is equipped to render one or more media types. In one embodiment, media player 242 is equipped to render media contents (including music/songs) provided in a digital encoding format compatible with the Real Player (available from Real Network of Seattle, Wash.). In another embodiment, media player 242 is equipped to render media content (including music/songs) provided in a digital encoding format compatible with the Window Media Player (available from Microsoft of Redmond, Wash.). In yet other embodiments, media player 242 is equipped to render video provided in the digital encoding format DVD or others yet developed. In still other embodiments, media player 242 is equipped to render one or more media encoded in one or more relatively higher fidelity format.

As illustrated in FIG. 2*a*-2*b*, in addition to the various hardware and/or software components to provide the various communication capabilities, for the embodiments, media content servers 120 further includes in particular digital performance key (DPK) generator 222 and media contents 224. DPK generator 222 is employed to generate the DPKs for the various media contents 224 purchased/licensed by the users/subscribers. For the various embodiments, a DPK is generated for each media content purchased/licensed by a user/subscriber. In other words, for these embodiments, each DPK is unique for each combination of media content and user/subscriber. In various embodiments, DPK generator 222 may generate the DPK using any one of a number of key generation techniques. In various embodiments, DPK generator 222 is adapted to generate the DPK by concatenating the user/subscriber's subscriber identifier and the media content identifier. In other embodiments, other identifiers and/or information (such as the portable media device's MAC address, date and time of purchase/license), and other deterministic functions that generate unique results may be employed instead.

Referring now specifically to FIG. 2*a*, for the various embodiments, a user/subscriber may initiate a transaction to purchase/license the performance rights of a media content offered/distributed by the digital media content service implemented by media content servers (MCS) 120, using portable media device (PMD) 102. The end user interface to facilitate the transaction may be implemented in any one of a number of manners, which are well within the ability of those of ordinary skill.

As shown, in response to a user/subscriber's request to initiate such a transaction (via e.g. a provided end user interface), PMD 102 requests a connection with MCS 120 (via e.g. a GPRS or other connection), operation 202. In response, MCS 120 accepts the request, and jointly establishes a communication connection, operation 204.

Later, PMD 102 submits a request to purchase/license the performance rights to a media content offered by MCS 120, operation 206. The request may be submitted e.g. after MCS 120 has presented to PMD 102 a list of media content available for purchase/license from MCS 120 (not illustrated). In various embodiments, the list may be presented by media types or based on one or more user/subscriber's attributes (e.g. the user demographic attributes, past purchases/licensing, and so forth). In various embodiments, PMD 102 may present the user/subscriber's subscriber identifier stored in its SIM 212 as part of the request to purchase/license. In alternate embodiments, PMD 102 may present the user/subscriber's subscriber identifier stored in its SIM 212 as part of the initial request to establish a connection, and MCS 120 may conduct the transaction based on this earlier provided subscriber identifier.

In any event, for the embodiments, in response to the request to purchase/license, and successful verification of payments (assuming the service is a pay per transaction service), MCS 120 generates a DPK for the media content requested. Further, MCS 120 returns the generated DPK to PMD 102, operation 208, which in turn stores the DPK in SIM 212. In alternate embodiments, the service may be a subscription service. For these embodiments, successful verification of payment may mean successful verification of the subscriber being current in payment of the periodic subscription service charge.

As described earlier, in various embodiments, the DPK is also persisted by the digital media content distribution service in case the SIM is lost or stolen. In the even the SIM is lost or stolen it may be deactivated, and physically replaced without exposing the subscriber to loss of their purchased media content.

In various embodiments, MCS 120 further automatically provides the media content encoded in a digital format designed for the relatively more resource constraint portable devices, e.g. MP3 in the case of music/song, operation 208. In various embodiments, each of the encoded media content is encrypted at least in part using the corresponding unique DPK for the subscriber and the particular media content. On receipt, PMD 102 stores the provided media content in local storage, no longer requiring communication with the digital media content distribution service to consume the media content. However, the media content cannot be fully decoded without access to the DPK stored on the SIM. The SIM may use the DPK in a variety of ways to decrypt the protected media content including providing selected decryption of pieces of the media content directly on the SIM. The decrypted content is then either decoded by the PMD, the set-top media device, or by the SIM itself as processing power allows.

In various embodiments, MCS 120 may provide the purchased/licensed media content only at the explicit request of the user/subscriber. That is, the user/subscriber may purchase/license the performance right without any plan to ever play/consume the purchased/licensed media content, when PMD 102 is not connected to MCS 120. In various embodiments, regardless whether the media content is provided automatically or on explicit request of the user/subscriber, the transaction and download responsibilities may be divided among different servers of MCS 120, with the transaction server providing PMD 102 with a uniform resource locator (URL) of a download server, from which PMD 102 may obtain the purchased/licensed media content. PMD 102 may in turn download the purchased/licensed media content using the provided URL.

Referring now to FIG. 2b, regardless of whether PMD 102 has previously downloaded a version of media content, for the various embodiments, PMD 102 may (additionally) request the purchased/licensed media content to be downloaded or streamed in a different digital encoded format, potentially of higher fidelity, smaller size, or some unique attribute including availability of a compatible CODEC, for consumption on PMD 102 or using a proximally located set-top media device 104 (which is adapted to handle a different digital encoding format potentially of higher fidelity for example). Other examples of the need for differing digital encoded formats could include web browser versions, the presence or absence of graphics accelerators for games, speaker configurations, dedicated input controls including limited or full size keyboards. Again, the streaming request may be facilitated through an end user interface implemented in any one of a number of manners, which are all within the ability of those of ordinary skill to implement.

As shown, in response to a user/subscriber's request to initiate streaming of a media content, PMD 102 requests a connection with MCS 120 (via e.g. a GPRS or other connection), operation 232. In response, MCS 120 accepts the request, and jointly establishes a communication connection, operation 234.

Next, PMD 102 submits a streaming request for a previously purchased/licensed media content, operation 236. The request may be submitted e.g. after PMD 102 presents a list of purchased/licensed media content available for streaming (not illustrated). In various embodiments, the list may be presented by media types, artists or other attributes (e.g. when the media content was last played by). In various embodiments, PMD 102 may present the DPK for the requested media content as part of the streaming request, or upon request. In various embodiments, PMD 102 may also specify other information as part of the streaming request, e.g. the desired digital encoding format (such as Windows Media Player or Real Player, in the case of music/song), and whether the contents are streamed to PMD 102 or a proximally disposed set-top media device 104. The latter specification may also include location information of the specified set-top media device 104, e.g. its IP address.

In various embodiments, MCS 120 may validate the DPK based on the subscriber identifier stored in SIM 212 of PMD 102, to ensure the DPK has not been improperly transferred to or acquired by another user. The MCS can deactivate a SIM, invalidate a single DPK, or a single subscriber's unique ID. The SIM can optionally be required to establish a connection with the MCS on a periodic basis in order to continue to decrypt media assets stored locally.

Referring now to FIG. 2c, wherein an exemplary interaction between PMD 102 and a proximally disposed set-top media device 104 is shown. As illustrated, for the embodiments, PMD 102 may send out one or more discovery packets to solicit a response and establish the presence of a proximally disposed set-top media device 104, operation 252. Assuming set-top media device 104 is proximally located within the wireless (or locally wired) communication range of PMD 102, set-top media device 104 responds to the discovery packets and make known of its proximal presence to PMD 102, operation 254. In various embodiments, set-top media device 104 may provide its location information (IP address, supported media types, supported digital encoding formats) and so forth, as part of the response, or in response to further inquiries from PMD 102 (e.g. other communications 258). In still other embodiments, PMD 102, set-top media device 104 and/or MCS 120 may discern the proximal disposition of PMD 102 and set-top media device 104 based on location information of devices, including but are not limited to using global positioning satellite (GPS) data.

For the illustrated embodiments, streaming media content is provided from MCS 120 to set-top media device 104 through PMD 102, operation 256. In alternate embodiments, media content may be streamed or downloaded from MCS 120 to set-top media device 104 directly. In various ones of these embodiments, where e.g. streaming/download requests may be made in batch, in lieu of the lower risk manner of one media content at a time, MCS 120 may further practice a validation procedure that periodically verifies PMD 102 and set-top media device 104 remain proximally disposed to each other, i.e. PMD 102 has not moved away. In various embodiments, an verification may involve having set-top media device 104 provides one or more answers to one or more challenges from MCS 104, where the answer or answers have to come from the SIM either through direction connection or through PMD 102 over a "short" range communication (in lieu of or in addition to having the SIM check in with MCS 120 periodically). In this scenario, the SIM might directly decrypt all or portions of the digital media content stream for additional security. Any device accessing the digital media content stream from the MCS will lose its ability to decrypt the encrypted portions of the stream if the SIM is disconnected or is moved out of physical proximity in the case of 'wireless connectivity'.

FIGS. 3a-3c and 4 illustrate PMD 102 in further detail, in accordance with various embodiments. The embodiments are the enhanced wireless mobile phone (WMP) embodiments alluded to earlier. However, as described earlier, in other embodiments, PMD 102 may be a "simple" portable audio/video player instead. As illustrated, for the embodiments, PMD/WMP 102 includes a fully functional base WMP unit 304 and a removable accessory cover 302, within which SIM 212 is disposed. In alternate embodiments, SIM 212 may be disposed in based WMP unit 304 instead. For the embodiments, base WMP unit 304 includes media player 214. In alternate embodiments, media player 214 may also be provided by removable accessory cover 302 instead.

FIGS. 3a and 3b illustrate a perspective view and a sideview of removable accessory cover 302 respectively. As illustrated, for the embodiments, cover 302 has a substantially U-shaped cover body, and designed to be snapped onto the base WMP unit 304 via a substantially side way motion (as defined by the expected orientation of PMD/WMP 102). In alternate embodiments, the cover does not have to be U-shaped and does not have to cover a significant portion of the phones exterior. It may be a conventional faceplate. For the embodiment, SIM 212 is disposed at the inside surface of the mid-section of the U-shaped cover body 302.

Figure 3C:
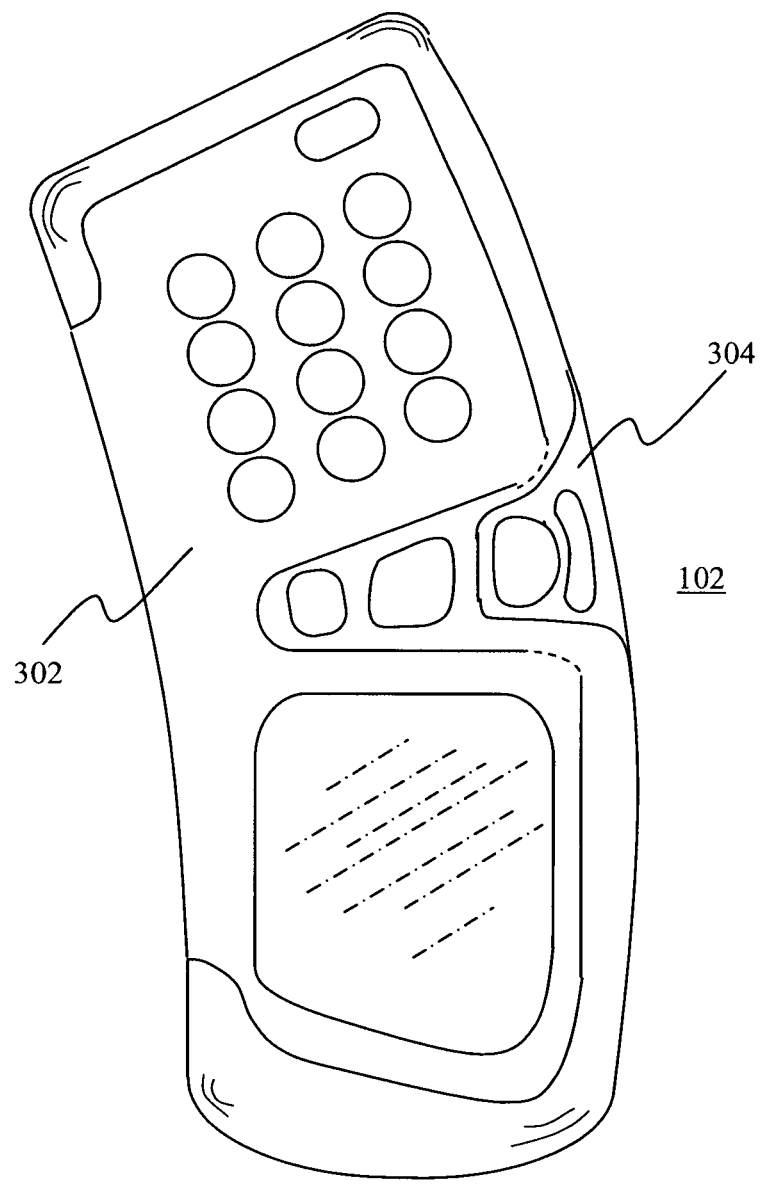

FIG. 3c illustrates a front view of the assembly, that is having removable accessory cover 302 and the base WMP unit 304 illustrated with cover 302 having been snapped on, i.e. attached, to the base WMP unit 304.

Removable accessory cover 302 provides a convenient way of upgrading base WMP unit 304 to include the earlier described media content purchasing/licensing and consumption/sharing functions of PMD 102. Moreover, exterior surfaces of removable accessory cover 302 provide digital media content distribution service an opportunity to brand the service. Further, it may optionally provide dedicated media controls, such as fast forward, stop, rewind, track forward, track back and record.

Figure 4:
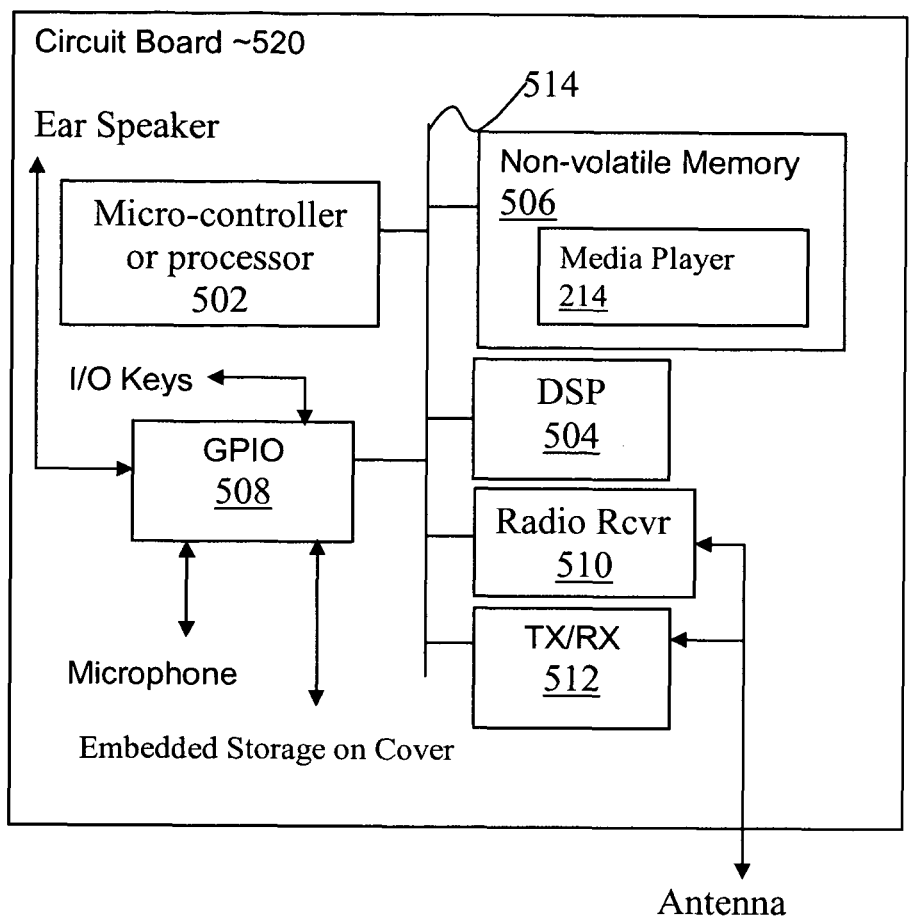
FIG. 4 illustrates an architecture view of the components of the wireless mobile phone of FIG. 3a-3c, in accordance with various embodiments.

FIG. 4 illustrates an architecture view of base WMP unit 304, in accordance with various embodiments. As illustrated, base WMP unit 304 includes elements found in conventional wireless mobile client devices, such as micro-controller/processor 502, digital signal processor (DSP) 504, non-volatile memory (local storage) 506, general purpose input/output (GPIO) interface 508, radio receiver 510, and transmit/receive (TX/RX) 512 (also known as a transceiver), coupled to each other via bus 514, and disposed on a circuit board 520.

Additionally, base WMP unit 304 is endowed with a software implementation of media player 214 having one or more CODEC adapted to support one or more digital encoding formats. In alternate embodiments, media player 214 may be implemented in hardware using e.g. ASIC.

Except for media player 214 provided to base WMP unit 304, each of these elements 502-514 performs its conventional function known in the art, and is intended to represent a broad range of such element and its equivalents. Further, TX/RX 512 may be designed to support one or more of any of the known signaling protocols, including but are not limited to CDMA, TDMA, GSM, and so forth, and adapted to send and receive location information, including GPS information. Moreover TX/RX 512 may be implemented using separate transmitter and receiver.

Accordingly, elements 502-514 will not be further described. Further, in alternate embodiments, PMD/WMP 102 may assume other form factors, including but not limited to a conventional substantially rectangular unibody form factor, or a conventional substantially rectangular flip phone form factor, with or without one or more removable attachable covers.

Figure 6:
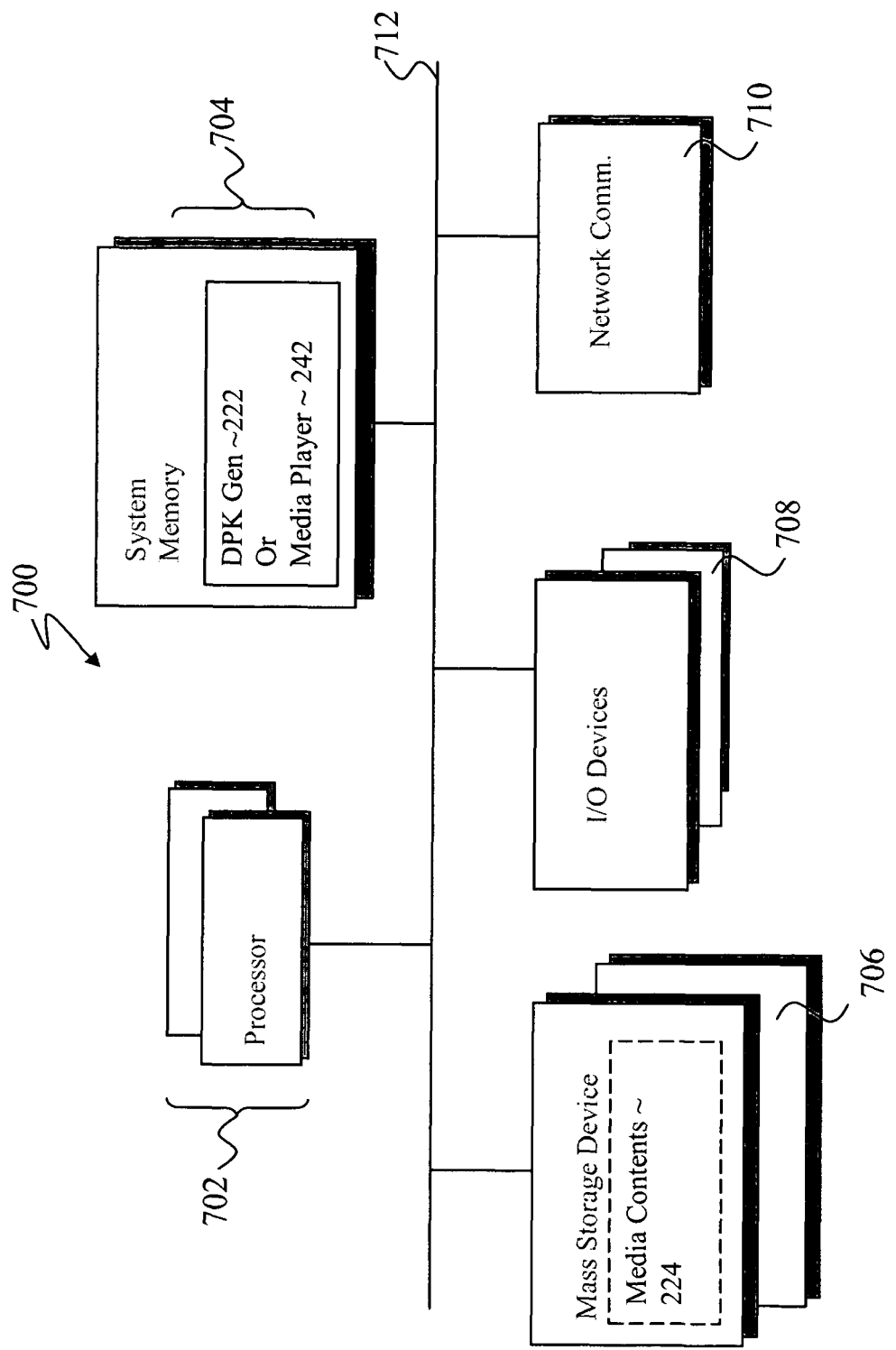
FIG. 6 illustrates an exemplary system suitable for use as a set-top media device or a media content server of FIG. 1, in accordance with various embodiments.

FIG. 6 illustrates an example computing device, suitable for use as set-top media device 104 or server 120, in accordance with some embodiments. As illustrated, computing device 700 includes one or more processors 702, and system memory 704. Additionally, computing device 700 includes mass storage devices 706 (such as diskette, hard drive, CDROM, DVD and so forth), input/output devices 708 (such as keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown).

Each of these elements performs its conventional functions known in the art. In particular, system memory 704 and mass storage 706 are employed to store a working copy and a permanent copy (not shown) of the programming instructions implementing media player 242 or DPK generator 222, depending on whether computing device 700 is employed to implement media device 104 or server 120. Additionally, if computing device 700 is employed to implement server 120, mass storage 706 may also be employed to store media content 224.

The permanent copy of the programming instructions may be loaded into mass storage 706 in the factory, or in the field, through e.g. a distribution medium (not shown) or through communication interface 710 (from a distribution server (not shown). Similarly, media content 224 may be provided to server 120 and stored in mass storage 706 in any one of a number of techniques known or to be designed.

The constitution of these elements 702-712 are known, and accordingly will not be further described.

Thus, it can be seen from the above descriptions, a novel digital media content distribution method, media devices and servers to practice the method, have been described. While the present invention has been described in terms of the earlier described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method for a digital media content distribution service to distribute digital media content, the method comprising:
   accepting by a server of the digital media content distribution service, a digital communication connection from a subscriber device of a subscriber of the digital media content distribution service, the subscriber device having a subscriber identification module with a unique subscriber identifier of the subscriber stored therein;

receiving from the subscriber device, by the server, a digital performance licensing request for a media content;

generating by the server, a digital performance right key for the media content for the subscriber, the digital performance right key comprising the unique subscriber identifier and a unique identifier of the media content;

providing by the server, the digital performance right key to the subscriber device for storage in the subscriber identifier module;

receiving directly from the subscriber device, by the server, a digital streaming request for streaming the media content independent from the subscriber device directly to an apparatus located proximally to the subscriber device, the digital streaming request including the digital performance right key;

performing, by the server, a validation procedure to verify that the subscriber device is proximally disposed to the proximally located apparatus; and solely in response to the digital streaming request received directly from the subscriber device, streaming the media content directly to a media player of the proximally located apparatus without additionally receiving the digital streaming request from the proximally located apparatus, wherein the media content is encrypted by the digital performance right key comprising the unique subscriber identifier and the unique identifier of the media content.

2. The method of claim 1, wherein the method further comprises issuing the subscriber identification module for installation into the subscriber device.

3. The method of claim 1, wherein the digital performance right key enables the subscriber to selectively consume the media content in a plurality of digital encoding formats, providing a plurality of fidelities.

4. The method of claim 3, further comprising:
streaming the media content in a first of the digital encoding formats to the subscriber device for rendering the media content on the subscriber device, the first digital encoding format providing rendering fidelity of the media content lower than at least a second of the digital encoding formats.

5. The method of claim 1, wherein the media content comprises a song, and the first digital encoding format is MP3.

6. The method of claim 3, wherein the method further comprises:
receiving from the subscriber device, by the server, a digital download request for the media content, the digital download request including the digital performance right key; and
providing the media content, by the server, in a first of the plurality of digital encoding formats to the subscriber device, the first digital encoding format providing rendering fidelity of the media content lower than at least a second of the plurality of digital encoding formats.

7. The method of claim 3, further comprising:
receiving from the subscriber device, by the server, a digital streaming request for streaming the media content to the subscriber device, after the media content has been provided to the proximally located apparatus in a first of the digital encoding formats providing rendering fidelity of the media content lower than at least a second of the digital encoding formats, the digital streaming request including the digital performance right key; and
wherein the streaming the media content to the media player of the proximally located apparatus comprises streaming the media content in the second digital encoding format providing higher rendering fidelity of the media content and involving a larger amount of digital data than the first digital encoding format.

8. The method of claim 3, further comprising:
streaming media content to the subscriber device in a first of the digital encoding formats providing rendering fidelity of the media content lower than at least a second of the digital encoding formats; and
wherein the streaming the media content to a media player of the proximally located apparatus comprises streaming the media content in the second digital encoding format providing higher rendering fidelity of the media content and involving a larger amount of digital data than the first digital encoding format.

9. The method of claim 1, wherein performing the validation procedure comprises periodically transmitting a challenge to the proximally located apparatus, wherein the challenge requires the proximally located apparatus to request a response from the subscriber device over a short range communication.

10. The method of claim 9, wherein the subscriber device directly decrypts at least a portion of the media content.

11. An apparatus comprising:
means for storing executable instructions operable, when executed, to:
establish a digital communication connection with a subscriber device associated with a subscriber of a digital media content distribution service, the subscriber device having a subscriber identification module with a unique subscriber identifier stored therein, the unique subscriber identifier identifying a subscriber of the digital media content distribution service;
receive, from the subscriber device, a request for a digital performance license for a media content;
generate a digital performance right key for the media content, the digital performance right key comprising the unique subscriber identifier and a unique identifier of the media content; and
provide the digital performance right key to the subscriber device for storage in the subscriber identifier module;
receive, directly from the subscriber device, a digital streaming request for streaming the media content to an apparatus located proximally to the subscriber device, the digital streaming request including the digital performance right key;
perform a validation procedure to verify that the subscriber device is proximally disposed to the proximally located apparatus; and
solely in response to the digital streaming request received directly from the subscriber device, stream, independent from the subscriber device, the media content directly to a media player of the proximally located apparatus without additionally receiving the streaming request from the proximally located apparatus, wherein the media content is encrypted by the digital performance right key comprising the unique subscriber identifier and the unique identifier of the media content; and
means for executing the stored executable instructions.

12. The apparatus of claim 11, wherein performing the validation procedure comprises periodically transmitting a challenge to the proximally located apparatus, wherein the challenge requires the proximally located apparatus to request a response from the subscriber device over a short range communication.

13. The apparatus of claim 12, wherein the subscriber device directly decrypts at least a portion of the media content.

14. A method for consuming digital media content comprising:
establishing a communication connection to a digital media content distribution service, by a subscriber device having a subscriber identifier module with a unique subscriber identifier of a subscriber of the digital media content service stored therein;
transmitting, by the subscriber device, a digital performance licensing request for a media content to the digital media content distribution service;
receiving, by the subscriber device, a digital performance right key for the media content from the digital media content distribution service, the digital performance right key comprising the unique subscriber identifier and a unique identifier for the media content;
storing by the subscriber device, the digital performance right key in the subscriber identifier module;
transmitting a first digital streaming request for the media content, by the subscriber device, directly to the digital media content distribution service to stream the media content independent from the subscriber device directly to an apparatus proximally located to the subscriber device, the digital streaming request including the digital performance right key and identification of the proximally located apparatus, wherein the digital media content distribution service streams the media content solely in response to the first digital streaming request transmitted directly to the digital media content distribution service, and wherein the media content is encrypted by the digital performance right key comprising the unique subscriber identifier and the unique identifier of the media content; and
verifying, by the subscriber device, that the proximally located apparatus remains proximally disposed to the subscriber device.

15. The method of claim 14, wherein the digital performance right key enables the subscriber to selectively consume the media content in any one of a plurality of digital encoding formats, providing a plurality of different fidelities.

16. The method of claim 15, further comprising:
receiving the media content, by the subscriber device, in a first of the digital encoding formats providing rendering fidelity of the media content lower than at least a second of the digital encoding format, and storing the received media content in the first digital encoding format in the subscriber identifier module.

17. The method of claim 16, wherein the media content comprises a song, and the first digital encoded format is MP3.

18. The method of claim 15, wherein the method further comprises:
transmitting a digital download request, by the subscriber device, for the media content to the digital media content distribution service, the digital download request including the digital performance right key;
receiving the media content, by the subscriber device, in a first of the digital encoding formats providing rendering fidelity lower than at least a second of the digital encoding format; and
storing the media content, by the subscriber device, in the first digital encoding format in the subscriber identifier module.

19. The method of claim 15, further comprising:
transmitting a second digital streaming request for the media content, by the subscriber device, to the digital media content distribution service to stream the media content to the subscriber device in a first of the digital encoding formats providing rendering fidelity lower than at least a second of the digital encoding formats, the digital streaming request including the digital performance right key; and
receiving streaming of the media content by the media player of the proximally located apparatus, in the second digital encoding format, the second digital encoding format providing higher fidelity of the media content and involving a larger amount of digital data than the first digital encoding format.

20. The method of claim 15, wherein the identification of the proximally located apparatus includes location information of the proximally located apparatus, and the method further comprises establishing communication with the proximally located apparatus, and obtaining the location information from the proximally located apparatus.

21. The method of claim 15, wherein the first digital streaming request further includes identification of the second digital encoding format for the streaming of the media content, and the method further comprises establishing communication with the proximally located apparatus.

22. The method of claim 14, wherein verifying that the proximally located apparatus remains proximally disposed to the subscriber device comprises periodically receiving, at the subscriber device, a request from the proximally located apparatus for a response over a short range communication, wherein the response is required to satisfy a challenge transmitted to the proximally located apparatus by the digital media content distribution service.

23. The method of claim 22, wherein the subscriber device directly decrypts at least a portion of the media content.

24. An apparatus comprising:
means for storing executable instructions operable, when executed, to:
establish a communication connection to a digital media content distribution service using a subscriber device, the subscriber device comprising a subscriber identifier module with a unique subscriber identifier stored therein, said unique subscriber identifier identifying a subscriber of the digital media content distribution service;
transmit a digital performance licensing request for a media content to the digital media content distribution service;
receive a digital performance right key for the media content from the digital media content distribution service, the digital performance right key comprising the unique subscriber identifier and a unique identifier of the media content;
store the digital performance right key in the subscriber identifier module, the subscriber identifier module configured to decrypt the media content with the digital performance right key;
transmit a digital streaming request for the media content, from the subscriber device, directly to the digital media content distribution service to stream the media content independent from the subscriber device directly to an apparatus proximally located to the subscriber device, the digital streaming request including the digital performance right key and identification of the proximally located apparatus, wherein the digital media content distribution service streams the media content solely in response to the digital streaming request transmitted directly to the digital media content distribution service, and wherein the media content is encrypted by the digital performance right key comprising the unique subscriber identifier and the unique identifier of the media content; and verify that the proximally located apparatus remains proximally disposed to the subscriber device; and means for executing the stored executable instructions.

25. The apparatus of claim 24, wherein the subscriber device is a wireless mobile phone.

26. The apparatus of claim 24, wherein the proximally located apparatus is a wireless mobile phone, and the subscriber device comprises a removable accessory cover.

27. The apparatus of claim 24, wherein verifying that the proximally located apparatus remains proximally disposed to the subscriber device comprises periodically receiving, at the subscriber device, a request from the proximally located apparatus for a response over a short range communication, wherein the response is required to satisfy a challenge transmitted to the proximally located apparatus by the digital media content distribution service.

28. The apparatus of claim 27, wherein the subscriber device directly decrypts at least a portion of the media content.

29. A method for consuming digital media content comprising:

at a media device, receiving streaming of a media content, the streaming coming directly from a digital media content distribution service independent from a subscriber device of a subscriber of the digital media content distribution service, the media content being streamed solely in response to a streaming request received by the digital media content distribution service directly from the subscriber device without the media device additionally transmitting the digital streaming request to the digital media content distribution service, the subscriber device being separate from the media device and proximally located to the media device, and the streaming request including a performance right key of the media content that comprises unique identifiers for both the media content and the subscriber, wherein the media content is encrypted by the performance right key comprising the unique identifiers for both the media content and the subscriber;

at the media device, verifying that the subscriber device remains proximally disposed to the media device; and rendering the received media content.

30. The method of claim 29, further comprising providing the proximally located subscriber device with location information to be provided to the digital media content distribution service for use to stream the media content.

31. The method of claim 29, further comprising providing the proximally located subscriber device with a digital encoding format to be provided to the digital media content distribution service for use to stream the media content.

32. The method of claim 29, wherein verifying that the subscriber device remain proximally disposed to the media device comprises periodically receiving, at the media device, a challenge from the digital media content distribution service, wherein the challenge requires the media device to request a response from the subscriber device over a short range communication.

33. The method of claim 32, wherein the subscriber device directly decrypts at least a portion of the media content.

34. An apparatus comprising:

means for storing executable instructions operable, when executed, to:

receive, at media device means, streaming of a media content directly from a digital media content distribution service, the media content being streamed solely in response to a streaming request received by the digital media content distribution service directly from the subscriber device without the media device means additionally transmitting the digital streaming request to the digital media content distribution service, the subscriber device being proximally located to the media device means, and the streaming request including a performance right key of the media content that comprises unique identifiers for both the media content and the subscriber, wherein the media content is encrypted by the performance right key comprising the unique identifiers for both the media content and the subscriber;

verify that the subscriber device remains proximally disposed to the media device means; and render the received media content; and means for executing the stored executable instructions.

35. The apparatus of claim 34, wherein verifying that the subscriber device remains proximally disposed to the media device means comprises periodically receiving, at the media device means, a challenge from the digital media content distribution service, wherein the challenge requires the media device means to request a response from the subscriber device over a short range communication.

36. The apparatus of claim 35, wherein the subscriber device directly decrypts at least a portion of the media content.

* * * * *

UNITED STATES PATENT AND TRADEMARK OFFICE
CERTIFICATE OF CORRECTION

| | |
|---|---|
| PATENT NO. | : 8,713,702 B2 |
| APPLICATION NO. | : 11/157481 |
| DATED | : April 29, 2014 |
| INVENTOR(S) | : G. Eric Engstrom et al. |

Page 1 of 1

It is certified that error appears in the above-identified patent and that said Letters Patent is hereby corrected as shown below:

In the Claims:

In column 11, line 46, in claim 5, delete "claim 1," and insert -- claim 4, --, therefor.

Signed and Sealed this
Nineteenth Day of August, 2014

Michelle K. Lee
*Deputy Director of the United States Patent and Trademark Office*